United States Patent [19]

Sakaguchi et al.

[11] Patent Number: 4,747,094

[45] Date of Patent: May 24, 1988

[54] SIGNAL COUPLING SYSTEM FOR OPTICAL REPEATER SYSTEM

[75] Inventors: Haruo Sakaguchi; Norio Seki, both of Tokyo; Shu Yamamoto, Kanagawa; Yoshinao Iwamoto, Saitama, all of Japan

[73] Assignee: Kokusai Denshin Denwa Co., Ltd., Tokyo, Japan

[21] Appl. No.: 773,971

[22] Filed: Sep. 9, 1985

[30] Foreign Application Priority Data

Sep. 11, 1984 [JP] Japan ............................. 59-188801

[51] Int. Cl.⁴ .............................................. H04B 9/00
[52] U.S. Cl. ........................................ 370/4; 455/601; 455/612
[58] Field of Search ............... 370/58, 67, 4; 455/601, 455/612

[56] References Cited

U.S. PATENT DOCUMENTS 4,603,415 7/1980 Nakada et al. ........................ 370/58

OTHER PUBLICATIONS

"Satellite Switched Time-Domain Multiple Access", EASCON '74 Record, IEEE Electronics and Aerospace Systems Convention, 1974, COMSAT Laboratories, Clarksburg, MD, pp. 189–196.

Primary Examiner—Robert L. Griffin
Assistant Examiner—Leslie Van Beek
Attorney, Agent, or Firm—Armstrong, Nikaido, Marmelstein & Kubovcik

[57] ABSTRACT

A signal coupler couples more than three transmitter-receivers through optical fiber cables and at least one repeater on a bit-multiplex system, by exchanging or reallocating each time slot according to a transmission station and the related destination. The coupler has a means to release the bit-multiplexing (or demultiplex) the signals from each transmitter by deriving the control clock signals from the information signals themselves. The coupler also has a means for multiplexing the bit signals for each destination by automatically adjusting the phase relationships among the released signals (demultiplexed signals) for bit-synchronization using a delay circuit.

6 Claims, 9 Drawing Sheets

SIGNAL COUPLING SYSTEM FOR OPTICAL REPEATER SYSTEM

BACKGROUND OF THE INVENTION

The present invention relates to a signal coupling and branching system with which it is possible to establish communications among more than three signal transmitter-receivers through a signal coupling and branching unit. More particularly, the present invention relates to an optical fiber signal coupling and branching unit which is applicable to optical fiber submarine cable networks.

In cases when it has been necessary to establish communications among N-numbered ($N \geq 3$) signal transmitter-receivers (hereinafter called "nodes"), it has been customary to establish a communication network among them by setting transmissions lines among the nodes, thereby transmitting and receiving information. One example this type of communication network is shown in FIG. 13. FIG. 13 shows a case in which $N=4$ and a communication network is formed by connecting nodes N1, N2, N3 and N4 through transmission lines C11, C12, C13, C14, C15 and C16. One type of communication network is a star-like network having a structure such that a signal coupling and branching unit to couple and to branch off signals from the nodes is set up at a point other than the N-numbered nodes and the nodes and the signal coupling and branching unit are connected through transmission lines. FIG. 14 shows a case in which $N=4$ and signals from N1, N2, N3 and N4 to other nodes are only collected through cables C17, C18, C19 and C20, in a signal coupling and branching unit SB. The signals are re-composed in the unit SB with respect to their destinations and transmitted to the nodes, respectively. If a star-like network, having the signal coupling and branching unit, is applied to a transmission system, like a submarine cable transmission system in which the cost of the cable with respect to the installation cost of the system is high, a substantial economic benefit will be realized because the overall length of the cable is shortened. Further, in a submarine cable system, the value of N is not so high, and when the number N is around 3-4, it is economical to transmit information at a high-speed using time-division multiplexing. Apart from the above, it is also possible to use a system in which transmission lines (e.q., fibers) are assigned among nodes. These fibers are incorporated into a transmission cable. Since the number of fibers and repeater circuits increases proportionally, use of such a system is not always more economical than use of time division multiplexing systems.

Further, to perform time-division multiplexing of information signals at each node, there are both word unit multiplexing systems and bit-multiplexing (bit-interleaving) systems. The word unit multiplexing system is ordinarily used in an encoding terminal station. It requires memory for rearranging signals to word structures. On the other hand, the bit-interleaving system does not require this kind of memory and it is sufficient for it to arrange a lower level group of pulse trains in sequence by time division so that it is often used for a higher rate multiplexing unit. In addition, bit-interleaving signals can be exchanged in a simple manner, and when they are applied to transmission systems with many repeaters, it is possible to extract clock signal components even when no communication is ON at some node so that it is advantageous a point of retiming and is suitable for a transmission system requiring simple underwater equipment such as a submarine cable transmission system.

Accordingly, a network system in which information signals multiplexed through a bit-multiplexing system are transmitted from each node and after being re-composed by time division at a signal coupling and branching unit, returned to each node while each node and the unit are connected by N-numbered cables in the form of a star. In addition, as one embodiment of the present invention, a case in which $N=3$ will also be described hereafter as an example.

To begin with, a network structure in the case of $N=3$ is shown in FIG. 15. According to this structure, information signals to nodes A, B and C are bit-interleaved and transmitted from a transmitting terminal station.

FIG. 16 shows conditions in which PCM signals to nodes B and C are bit-interleaved at the node A wherein (a) and (b) indicate a train of pulses to the node B and C, respectively, each showing that the n-numbered PCM signal pulses in a bit period T constitute a single frame, with Tf indicating a frame period. If this train of pulses is multiplexed in a bit period $T/2$, a bit-interleaved train of signal pulses shown by (c) is obtained. The same thing can be said at nodes B and C. Thus the trains of pulses multiplexed at each node are transmitted to the signal coupling and branching unit SB through fibers F incorporated into cables CBL and repeaters R.

Next, in signal coupling and branching unit SB, the connections among the nodes are time divisionally changed by a period (T/2) through switches arranged therein and the signals from each node are re-arranged for their destinations. The operation of the SB is as follows: Assuming that the phase relationships among the trains of pulses from each node to the unit SB are in the conditions shown in FIG. 17(a), the connecting conditions of the switches are controlled repeatedly by the period (T/2) as shown in FIG. 17(b) so that the signals are time-divisionally connected and re-arranged as shown in FIG. 17(c) to be then transmitted to each node through fibers F' and repeaters R' shown in FIG. 15. Then the bit-interleaved signals are received by a receiving terminal station RT at each node and separated to recover the lower-speed signal for each node.

We have described the operation principle of the transmission branching system in which information signals to address are multiplexed by bit at nodes and the multiplexed signals are re-arranged by time division and returned to the nodes.

However, the following problems are encountered when this system is applied to optical fiber submarine cable transmission systems.

In order to explain the operation principle of the transmission branching system briefly, we have taken up, by way of example, a case in which information signals from each node pass on the switches in the unit in synchronism with the connecting conditions of the switch as shown in FIG. 17. However, if the phase relationships between signal and connecting condition of the switch should be differentiated from those shown in FIG. 17(a) and (b), the quality of the signals would deteriorate and the signals would sometimes be connected to the uncorrect nodes. Therefore, to make the connecting conditions of the switch synchronized with the information signals, various kinds of synchronization systems are employed. One example of such a system is one in which one node acts as a reference station and transmits switch control signals while the other node adjusts the transmission timing of the information signals to synchronize with the connecting conditions of switches. The above adjustment is performed every time the system is started and the cable transmission delay time varies so that constant measurements of the cable transmission delay time and the related complicated operations among the nodes become necessary. Furthermore, redundant structures allowing control signals to be transmitted from nodes other than the reference station and monitoring and switching control system are also necessitated.

Another type of system is one in which a memory is provided within the signal coupling and branching unit to store input information signals and the signals addressed to each node are read out time divisionally to branch off them. Still another example of system is one in which the signal coupling and branching unit has a switch control signal source and the phase difference between the signals from each node and the switch connecting conditions is detected to send a transmission timing signal to each node. However, these systems are unsuitable for underwater equipment because they are unavoidably large in size.

As described above, the conventional synchronization system has had the above-mentioned disadvantages of necessitating the complicated co-related operations among the nodes for synchronization and the auxiliary redundant structure for transmitting the switch control signals and the monitoring and switching control system therefore, and also the disadvantage of the circuit of the signal coupling and branching unit being too large for underwater equipment.

SUMMARY OF THE INVENTION

Accordingly, the objects of the present invention is to provide a signal coupling and branching unit having a circuit capable of being mounted within the conventional submarine repeater housing and a signal coupling and branching unit which is capable of synchronizing the switch connection conditions with information signals in a simple manner, which can sample the switch control signals easily and which does not require a monitoring and control system meeting the redundancy of the switch control signals.

The above and other objects are attained by an optical fiber signal branch-transmission system comprising at least three transmitter-recievers to transmit and to receive signals, a single signal coupler to couple and to branch off signals from the signal transmitter-receivers, optical fiber transmission lines for connecting transmitter-receivers to said signal coupler through more than one optical repeater, and the signal coupler exchanging signals among the transmitter-receivers based upon bit-multiplex operation, wherein the signal coupler has a first means for releasing bit-interleaved signals (demultiplexing signals) from transmitters by deriving control signals from information signals themselves and spatially separating time slots for each destination, and a second means for multiplexing the spatially separated signals for each destinations by automatically adjusting phase relationships among signals for bit-synchronization by using a delay circuit.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
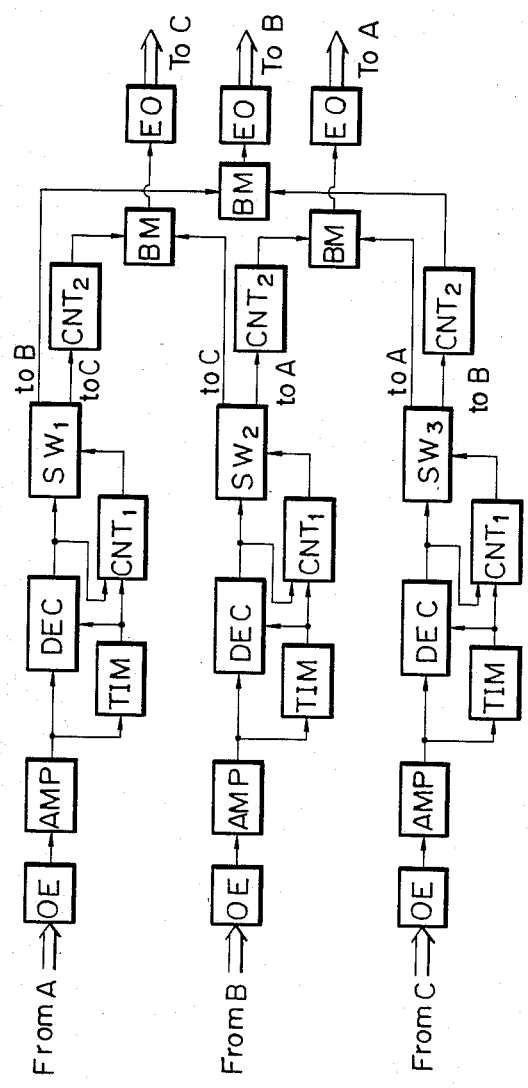
FIG. 1 is a block diagram of a coupler according to the present invention.
Figure 15:
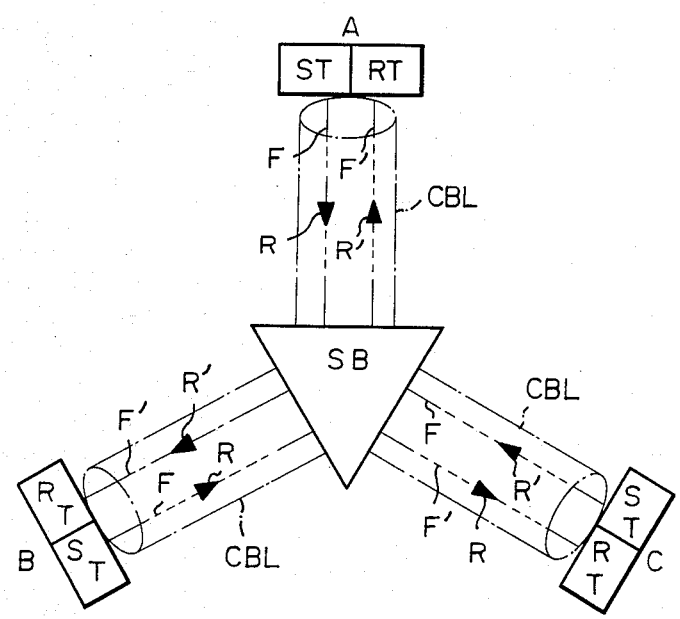
Figure 16:
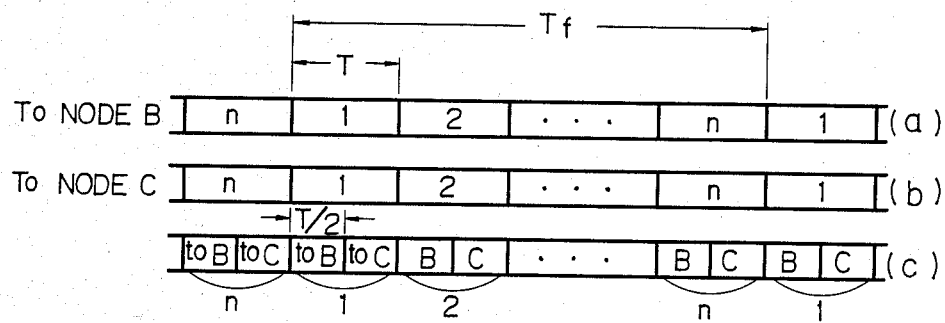
FIGS. 16 and 17 show operational timing sequence of a prior art.
Figure 17:
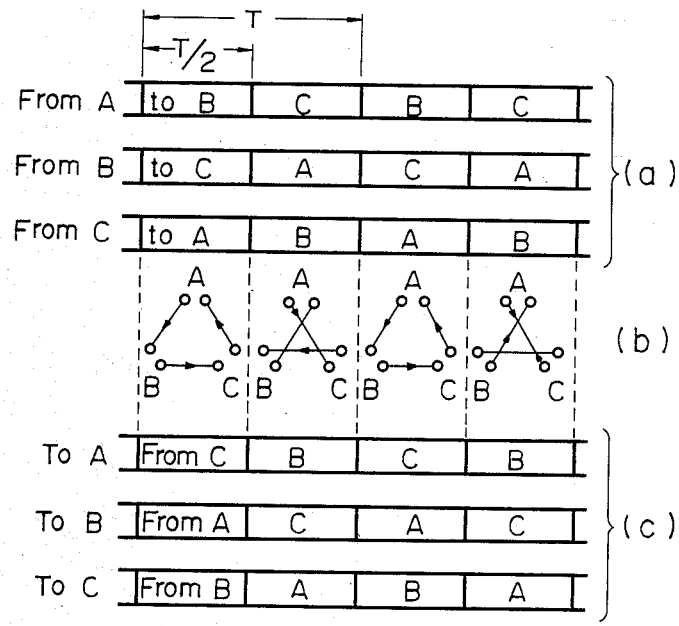

One embodiment of the present invention is shown in FIG. 1, which is a block diagram of a signal coupling and branching unit configured using the present invention. In this embodiment, transmission between each node and the signal coupling and branching unit is the same as shown in FIG. 15 and information signals are transmitted from each node through fiber F and a repeater R. In FIG. 1, the optical information signals from each node are converted into electrical signals at optical electric conversion circuit (O/E conversion circuit) OE, equalized and amplified at the next stage AMP and a part of the output of the AMP is introduced to a timing circuit TIM to extract the clock components of the signals. Further, the remaining part of the output of the AMP is determined and re-timed at decision circuit DEC to make regenerated pulses. The above process is the same as for conventional optical repeaters, but the important feature of the present invention lies in the provision of control circuit CNT1 and CNT2. The control circuit CNT1, which will be described in detail later, detects switch changeover signals from input information signals, controls a later stage 1×2 switch SW to separate the information signals into predetermined branches to thereby release the bit-multiplexing of the signals (i.e., demultiplex the signals). The control circuit CNT2, which will also be described in detail later, synchronizes the information signals to be coupled by automatically adjusting phase differences among them. After that, the signals are coupled at a bit-interleaved bit multiplexer BM to obtain again trains of pulse multiplexed by bit and after they are converted into optical signals at the optical electric conversion circuits (E/O conversion circuits) EO, the signals are transmitted to each node.

Figure 2:
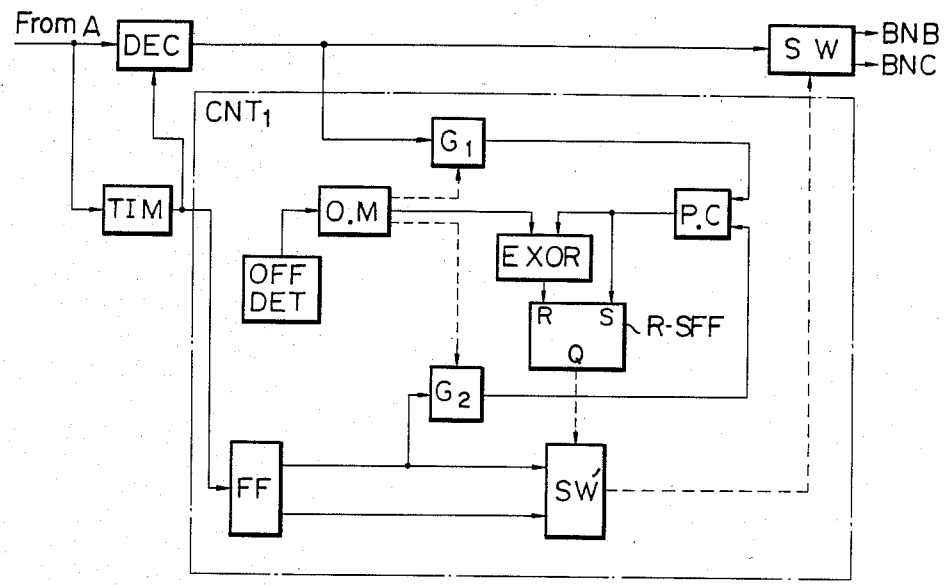
FIG. 2 is a block diagram of the control circuit $CNT_1$.

FIG. 2 shows the structure of the control circuit CNT1 (Enclosed in a chain line).

Figure 3:
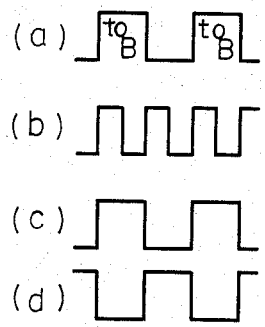
FIGS. 3 and 4 are operational waveforms of FIG. 2.

In principle, this circuit passes a clock signal extracted from an information signal to the flipflop circuit FF to obtain from the latter two outputs of opposite phases. Then it selects one of the outputs to control a selecting switch and assign the signal on a time slot for each node to a specific branch. Therefore, some limitation is applied on the transmission signal for a short time at the beginning of communication. Except for that short time, no particular process at all is necessary at each node. What is meant by the limitation is that "all mark" signals are put into only the time slot for a specific node for a short time at the beginning of communication. Now, assuming that "all mark" signals (all "1") are put together into the time slot for node B, then when the signal from node A is received and regenerated by the signal coupling and branching circuit, the signal (a) shown in FIG. 3 is obtained. When a timing signal is extracted, the clock component (b) in FIG. 3 is obtained. If this clock component is passed through flip-flop circuit FF, two signals of opposite phases as shown by (c) and (d) in FIG. 3 are obtained as the outputs of FF. Either of the signals and the regenerated output (a) are compared by a phase comparator PC to determine whether they are in the same or opposite phase and one of the FF outputs which is in the same phase with the regenerated output is selected by controlling a $2\times1$ selecting switch SW'. Further, it is possible to assign a signal on a time slot for the node B to a predetermined branch line BNB by controlling a $1\times2$ switch SW of the main line with the output of the $2\times1$ selecting switch SW'. In this case, once the time slot has corresponded to the switched branch, they will keep the same condition. To detect the initiation of communication automatically, use is made of the output of an input OFF detecting circuit OFFDET. Conventionally, some contrivance is made on the optical repeater to keep the level of a signal constant when the signal is processed at a later stage by automatically controlling the internal gain of an avalanche photodiode (APD) used in the O/E converter or the amplitude of the amplifier, in proportion to the increase and decrease of the level of an optical signal input to the repeater.

Figure 4:
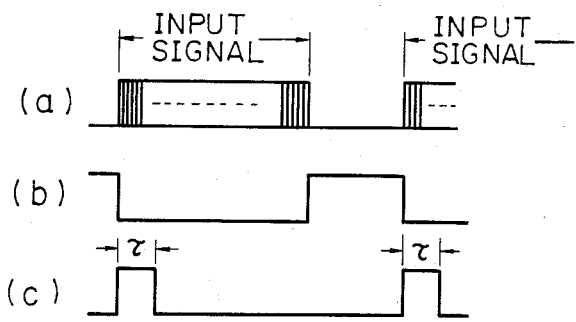

In such a system as this, when no input signal is present due to erroneous operation of the decision and regeneration circuit, the repeater sometimes generates outputs at random, resulting in an obstacle to the detection of a failure of the repeater. Therefore to control the internal gain of the APD, a signal OFF detecting circuit is inherently accomodated within the repeater. The signal OFF detecting circuit generates an output (b) in FIG. 4, corresponding to the presence and the absence of the input signal (a) shown in FIG. 4. Accordingly, it is possible to ascertain initiation of communication by detecting the falling of the waveform of the output of the circuit. When a monostable multivibrator OM is triggered with the falling point of the waveform of OFFDET, the output (c) shown in FIG. 4 can be obtained. In FIG. 4, $\tau$ designates the pulse width of the output of the OM. During this period, two gate circuits G1 and G2 in FIG. 2 are opened and the phase difference between the output of the DEC and that of the FF is detected by phase comparator PC. The phase comparator is so constructed that when the phase difference between two input pulses is zero, it generates an output "0" and "1" when the difference is . A part of the output of the phase comparator is introduced to an exclusive OR circuit EXOR together with the output of the monostable multivibrator OM and the output of the EXOR is introduced to a R-S flipflop together with the remaining part of the output of the PC. Thus, with the above structure, when the output of the OM is "1", the output of the PC appears as the output of the R-S FF to control the $2\times1$ selecting switch SW'. Further, when the output of the OM is zero, the two gate circuit G1 and G2 are closed and the inputs to the PC becomes zero altogether. In this case, the inputs to the R-S FF become zero altogether and therefore, the output of the R-S FF will be that which is generated when the output of the OM is "1" so that the condition of the $2\times1$ selecting switch SW' is kept as it is. Therefore, when initiating communications, all "1" signals are sent to the time slot for a certain node at least during a period determined by the pulse width $\tau$ of the OM and then signals to each node are sent continuously, it is possible to make the time slot correspond to the branches of the selecting switch SW automatically. In this circuit, the G1, G2 and the SW' can be formed of simple gate circuits and OM, EXOR and R-S FF can be formed of simple logic circuits. Further, the phase comparator PC can be formed easily be making a flipflop circuit go ON at one of two input phases and OFF at the other input pulse and filtering the DC component of the output of the circuit so that the control circuit CNT1 itself can be realized in small size.

Figure 5:
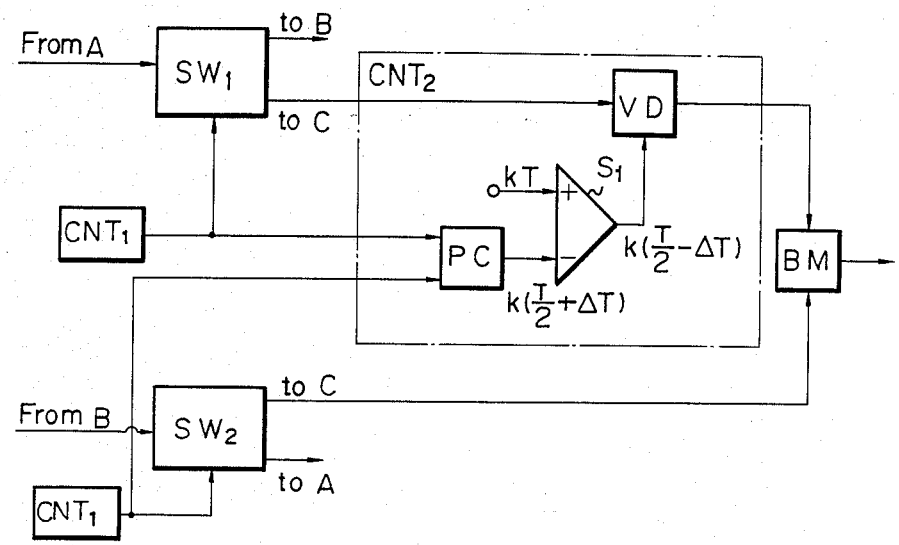
FIG. 5 is a block diagram of the control circuit $CNT_2$ of FIG. 1.
Figure 6:
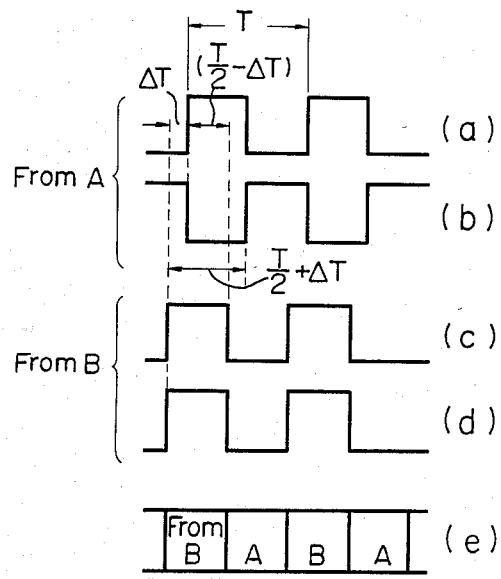
FIGS. 6 and 7 are operational waveforms of FIG. 5.
Figure 7:
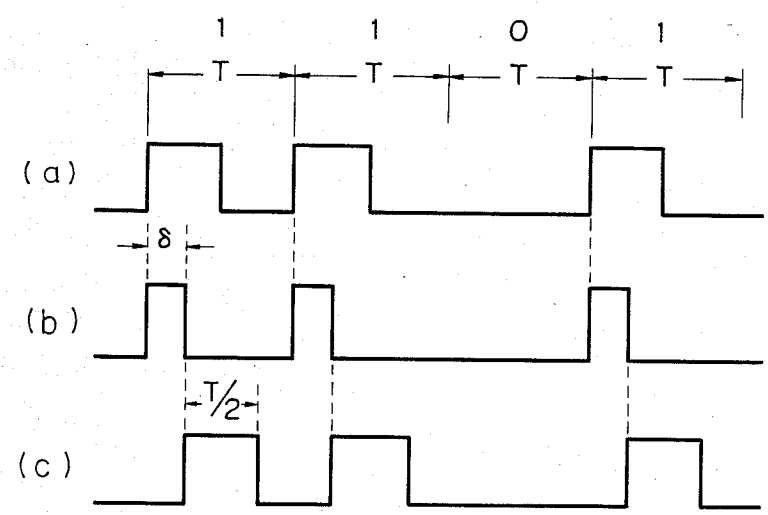

Next, the structure and operation of the other control circuit CNT2 shown in FIG. 1 will now be described. This control circuit synchronizes pulses to be coupled by detecting the phase differences between the pulses. One embodiment thereof is shown in FIG. 5. With this embodiment, using an example, a case in which information pulses from the nodes A and B to the node C are multiplexed. Assuming that the information pulses are in the phase relationships shown by (a) and (c) in FIG. 6 with a time delay $\Delta T$, then, when the train of pulses from the node A is delayed by $(T/2-\Delta T)$, it is possible to provide a time difference by T/2 between both pulses and when the pulses are coupled, it is possible to bit-interleave them. In this case, when, for example, the outputs of the control circuits CNT1 as explained with reference to FIG. 2 are used as comparison signals, the output of CNT1 with respect to the signals from nodes A and B are as shown by (b) and (d) in FIG. 6 and the time difference between them will be $(T/2+\Delta T)$ and hence an output $k(T/2+\Delta T)$ proportional to $(T/2+\Delta T)$ is obtained as the output of the phase comparator shown in FIG. 5 (k is fixed constant). After that, the output is input to an analog subtraction circuit S1 where a reference voltage kT proportional to the fixed time T is subtracted from the output to obtain $k(T/2-\Delta T)$ as the output of the circuit S1. Output S1 controls a variable delay circuit to delay the train of pulses from the node A by $(T/2-\Delta T)$ and the delayed train of pulses from the node A is coupled with the train of pulses from the node B to complete bit-multiplexing the pulses with the trains of pulses shown in FIG. 6(e). The phase comparator shown in FIG. 5 is realized by that of FIG. 2. Further, the variable delay circuit VD can be formed of two monostable multivibrators, for example. That is, as is already known, when a trigger pulse is applied on a monostable multivibrator, it is possible to obtain a pulse of a width determined by the circuit constant (resistance$\times$capacitance). Accordingly, if a pulse of a width equal to the desired amount of delay is produced by controlling the circuit constant and then the next stage monostable multivibrator is driven at the falling edge of the pulse, the desired purpose will be obtained as shown in FIG. 7. FIG. 7(a) shows a train of input pulses to the VD. In case it is desired to delay the pulses by $\delta$, the previous stage multivibrator is first driven at the rising edge of the pulses. The pulse width $\delta$ of the multivibrator can be controlled as described above and to obtain the output pulse shown in FIG. 7(b). Next, the later stage monostable multivibrator is driven with the falling of the output pulse. In this case, if the pulse width of the multivibrator is controlled to become T/2 by fixing the circuit constant, it is possible to obtain for the VD a train of input phases delayed by δ.

Further, the bit-multiplexing circuit BM in FIG. 5 may be formed of a hybrid circuit or of a sampling circuit in which latter the output of the timing circuit is multiplied to sample the two signals to be coupled. Since two signals are to be phase-compared, clock signals may be used. Further, even in case one of the signals to be coupled is absent, it is apparent that the control circuit CNT2 operates correctly.

As described above, it is possible with the present invention by using two control circuits that switch changeover signals can be extracted from input information signals and the communication time slots for each node can be held to correspond to the branches to release the bit-multiplexing of the signals and then the signals can be bit-multiplexed again by automatically detecting and adjusting the phase difference between the signals that are to be coupled.

Further, the circuit structure of the signal coupling and branching unit according to the present invention may be of a size substantially equal to the overall size of N-numbered optical repeater circuits when the number of nodes is N since the control circuit can be small in size. As the existing repeater casing can include three pairs (six circuits) of repeater circuit for transmission and reception, a signal coupling and branching unit having up to six nodes can be accommodated in the existing repeater casing.

Figure 8:
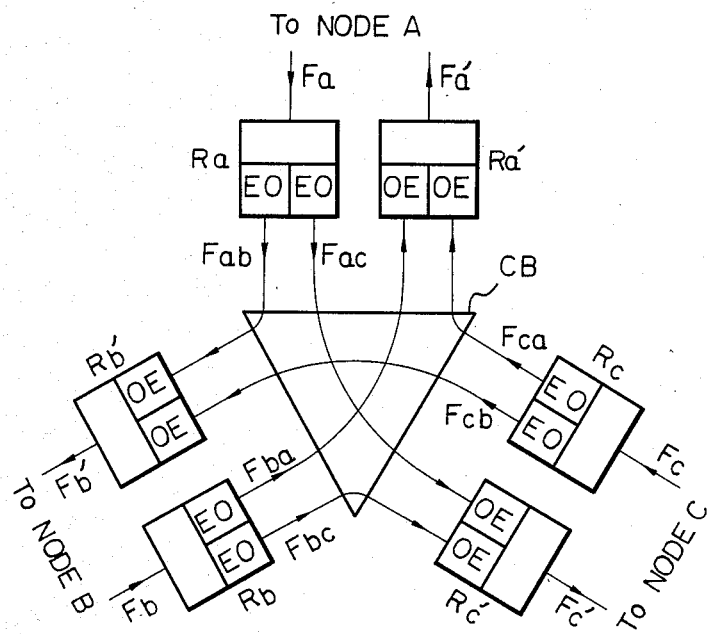
FIG. 8 is a block diagram of another embodiment of the present invention.

FIG. 8 shows another embodiment of the present invention. The feature of the present invention resides in the active elements of the signal coupling and branching unit, shown in FIG. 1, being incorporated in the repeaters adjacent the unit while the unit itself is formed of the stationary connecting circuit comprising only passive elements. The trains of pulses multiplexed by bit at each node are transmitted through the fibers Fa, Fb and Fc as they are regenerated and repeated. In this case, in the repeater circuits Ra, Rb and Rc immediately before the stationary connecting circuit CB, the signals are demultiplexed after decision and regeneration, the signals are electro-optically converted, respectively, and introduced into the stationary connecting circuit through fibers Fab, Fac, Fba, Fbc, Fca and Fcb assigned by destination so that CB where they are connected as determined previously. Then the signals are received by repeater circuits R'a, R'b and R'c located adjacent to the CB, where they are bit-multiplexed after decision and regeneration and transmitted to the respective nodes through fibers F'a, F'b and F'c.

Figure 9:
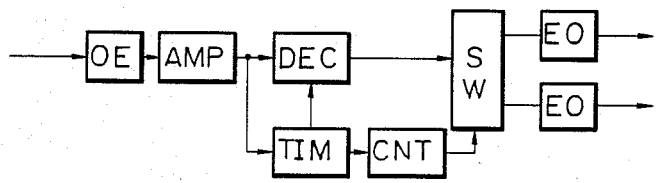
FIGS. 9, 10 and 11 are block diagrams of a repeater which is coupled with the present coupler.

FIG. 9 is a block diagram of the repeater circuit located immediately before the CB. The repeater circuit selects branch lines by demultiplexing the signals as already described with reference to FIG. 1 and after that, the signals are electro-optically converted to be transmitted to the allotted fibers.

Figure 10:
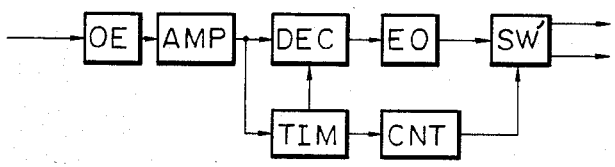
Figure 11:
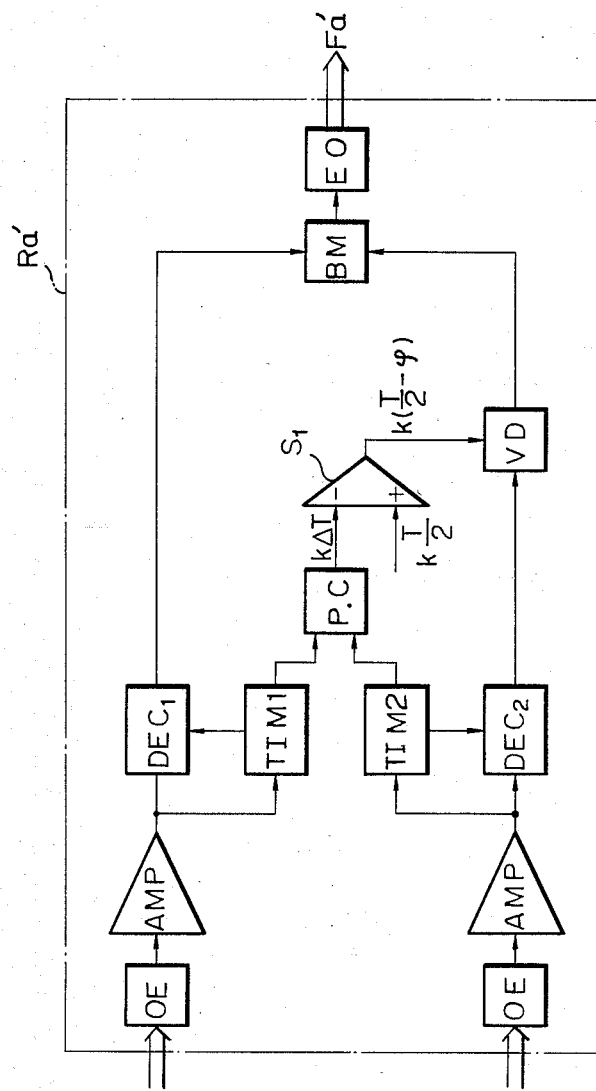

FIG. 10 is a variation of FIG. 9 in which the multiplexing of the signals is released by the optical switch SW' after the signals are electro-optically converted. Further, FIG. 11 is a block diagram of the repeater circuit immediately after the CB.

The deciding and regenerating operations performed by the repeater are identical to those of the conventional optical repeater, and detection of phase differences between two inputs and adjustment of delay time between them are also identical to the operations of the control circuit CNT2 shown in FIG. 5 except that the former uses the outputs of the timing circuits as inputs to the phase comparator. In this cases since the clock signals from timing circuit and regenerating output of the repeater are a one-to-one phase relationship with each other, it is possible to adjust the phase of outputs of the decision circuits by detecting the phase difference between the clock signals.

Figure 12:
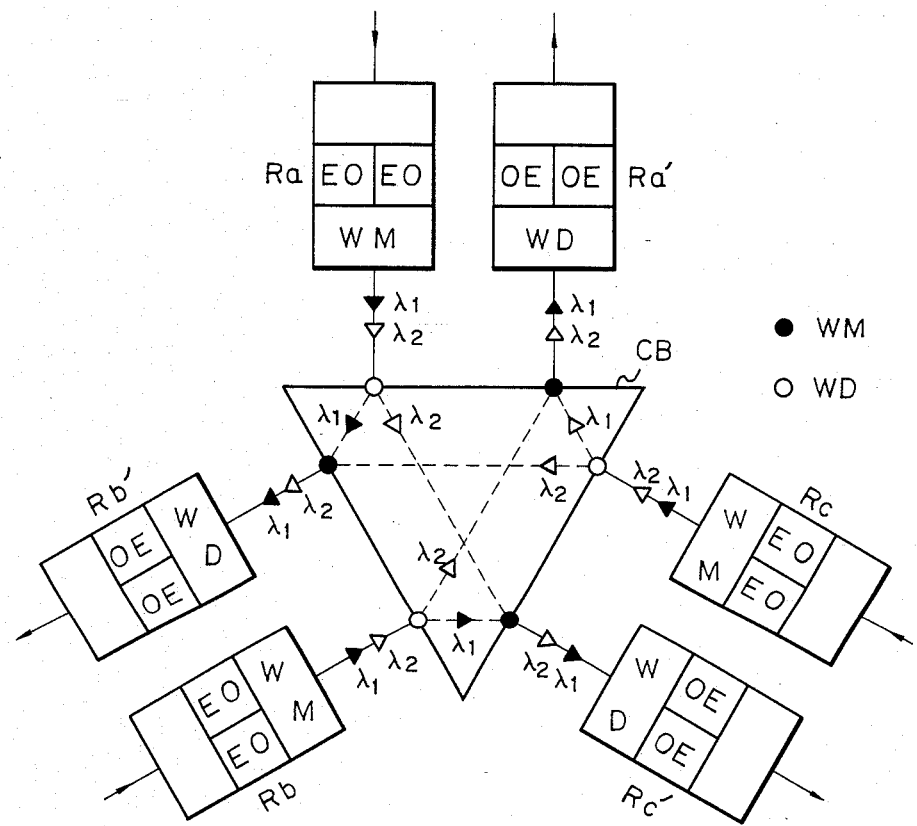
FIG. 12 is still another block diagram of the present coupler.
Figure 13:
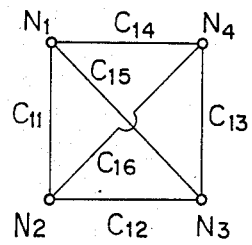
FIGS. 13, 14 and 15 are block diagrams of a prior art.
Figure 14:
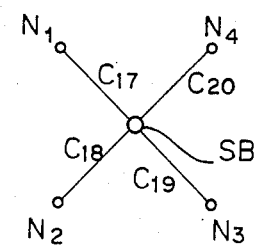

FIG. 12 shows another embodiment of the present invention. This embodiment is different from the embodiment shown in FIG. 8 in that in the former, the wavelength division multiplexing (WDM) transmission of signals is performed between the stationary connecting circuit CB and these adjacent repeaters. In FIG. 12, the structure of repeaters Ra, Rb and Rc immediately before the CB is basically identical with the structure of repeaters described with reference to FIG. 9 but is different from the latter in that in the former, the signals transmitted to each node after they are released from bit-multiplexing (demultiplexed) are assigned different wavelength $\lambda_1$ and $\lambda_2$ when they are converted into optical signals by E/O converters EO, and these signals are introduced into single fibers through optical multiplexers, respectively, for WDM transmission. Likewise, each of repeaters R'a, R'b and R'c immediately after the CB is different from each of those described with reference to FIG. 11 in that the former uses optical demultiplexer WD to spatially separate two optical signals of different wavelengths transmitted from each node through the single fiber and to introduce them to the corresponding O/E converter OE. However, regarding the repeating and phase adjusting functions of the repeaters R'a, R'b and R'c, these repeaters are identical to these described with reference to FIG. 11. Thus, by the WDM transmission of signals according to this embodiment in which the signals are assigned different wavelengths by destinations, the number of fibers in each cable becomes equal throughout the transmission network and the cable manufacturing process becomes uniform. Further, the CB can be formed easily by a combination of three optical multiplexers and three optical demultiplexers. Furthermore, if the information signals among the nodes are connected as shown in the SB in FIG. 12, the wavelengths to be assigned to these signals can only be the two waves $\lambda_1$ and $\lambda_2$.

In the embodiments shown in FIGS. 8 and 12, the scale of the repeater arrangement is such that the total number (N) of the repeaters (for both transmission and reception) adjacent to the stationary connecting circuit CB is equal to the number of nodes, and is substantially equal to the signal coupling and branching circuit shown in FIG. 1. It should be noted that in the case of the conventional repeater arrangement shown in FIG. 1, if any common circuit (for example, the power supply circuit in the unit) should fail, there will be a possibility that communication will fail throughout the entire communication system but in the case of the present invention in which the functions of the signal coupling and branching unit are distributed into each repeater as shown in FIGS. 8 and 12, the influence of these failures can be minimized.

As the bit-multiplexed signal branching system used by the present invention and described hereinabove with reference to three installations is advantageous in that the switch connecting conditions and information signals are synchronized with each other, the complicated co-related operations which have hitherto been required at each node are simplified and, as the switch control signals are extract easily, the use of a monitoring and switch controling system which use control signal redundancy are not required. Further, since the control circuit is small in size, it is possible to accomodate the signal multiplexing and branching circuit within a submarine repeater casing, thereby realizing an economical and highly reliable optical fiber submarine cable network.

In addition, it should be noted that although the embodiments of the present invention are described as having three nodes, it is conjecture that the present invention can also be applied to cases where $N(nodes) \geq 4$.

From the foregoing it will now be apparent that a new and improved signal coupling system for optical fiber communication system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical fiber digital signal branch-transmission system comprising:
    at least three signal transmitter-receivers each located at different destination locations, each signal transmitter-receiver to transmit a bit-multiplexed information signal after multiplexing information based on a bit-multiplex operation, said bit-multiplexed information signal being transmitted to other signal transmitter-receivers and, each signal transmitter-receiver to receive and to demultiplex the bit-multiplexed information signal from said other signal transmitter-receivers at said different destination locations;
    a single signal coupler to branch off said bit-multiplexed information signals from said signal transmitter-receivers and to couple branched off bit-multiplexed information signals to a same destination location;
    optical fiber transmission lines connecting each said signal transmitter-receiver to said signal coupler through at least one optical repeater, said signal coupler exchanging said bit-multiplexed information signals among said signal transmitter-receivers based upon said bit-multiplex operation,
    said signal coupler having a first means for demultiplexing the multiplexed-signals from said signal transmitter-receivers by deriving control signals from said bit-multiplexed information signals and for distributing the bit-multiplexed information signals allocated in time slots for their destinations into each different destination locations, and
    a second means for multiplexing distributed information signals for the same destination into each different destination location by detecting the phase differences between said distributed information signals and by automatically adjusting phase relationships between said distributed information signals for bit-synchronization.

2. An optical fiber signal branch-transmission system according to claim 1, wherein active elements of said signal coupler are mounted in said optical repeaters, said signal coupler being composed of merely passive elements.

3. An optical fiber signal branch-transmission system according to claim 1, wherein each of an upward signal and a downward signal between each said signal transmitter-receiver and said signal coupler is transmitted through separate optical fibers.

4. An optical fiber signal branch-transmission system according to claim 7, wherein each of an upward signal and a downward signal between each said signal transmitter-receiver and said signal coupler is transmitted through a single optical fiber with a wavelength division multiplex transmission system.

5. An optical signal branch transmission system according to claim 1, wherein said first means has a signal level OFF detection circuit for detecting a beginning of said bit-multiplexed information signal, a monostable multivibrator connected to said signal level OFF detection circuit, said monostable multivibrator outputting a predetermined width of pulse which is responsive to an output of said signal level OFF detection circuit, gate circuits which pass said bit-multiplexed information signals and timing signals in response to an output of said monostable multivibrator, and switch means for distributing said bit-multiplexed information signals allocated in time slots to each different destination location according to a predetermined sequence which is based on an output of said gate circuits.

6. An optical signal branch transmission system according to claim 1, wherein said second means has a phase comparator for comparing a phase of the distributed bit-multiplexed information signals of said first means, a subtractor for providing a difference between a predetermined fixed value and an output of said phase comparator, a variable delay circuit for providing a delay to said distributed bit-multiplexed informationignal of said first means according to an output of said subtractor, and a bit multiplexer for coupling an output of said variable delay circuit with said distributed bit-multiplexed information signals of the first means.

* * * * *